«12» United States Patent
Tazoe et al.

«10» Patent No.: US 7,683,902 B1
«45» Date of Patent: Mar. 23, 2010

«54» METHOD TO VISUALIZE PERFORMANCE DATA OF A MULTI-LAYERED STATE DIAGRAM

«75» Inventors: Eiichi Tazoe, Tokyo (JP); Masami Tada, Sagamihara (JP)

«73» Assignee: International Business Machines Corporation, Armonk, NY (US)

«*» Notice: Subject to any disclaimer, the term of this patent is extended or adjusted under 35 U.S.C. 154(b) by 0 days.

«21» Appl. No.: 12/413,395

«22» Filed: Mar. 27, 2009

«51» Int. Cl.
*G06T 11/20* (2006.01)
*G06F 9/45* (2006.01)

«52» U.S. Cl. .................................. 345/440; 703/22
«58» Field of Classification Search ................ 345/440; 703/22
See application file for complete search history.

«56» References Cited

U.S. PATENT DOCUMENTS

| | | |
|---|---|---|
| 5,659,554 A | 8/1997 | Okayasu |
| 5,701,137 A | 12/1997 | Kiernan et al. |
| 6,199,098 B1 | 3/2001 | Jones et al. |
| 6,509,898 B2 | 1/2003 | Chi et al. |
| 6,711,715 B1 | 3/2004 | Grealish |
| 6,922,829 B2 | 7/2005 | Ward et al. |
| 7,010,744 B1 | 3/2006 | Torgerson |
| 7,336,279 B1 | 2/2008 | Takiguchi |
| 7,415,483 B2 | 8/2008 | Kuntz-Mayr et al. |
| 2001/0030666 A1 | 10/2001 | Okada |
| 2002/0129178 A1 | 9/2002 | Steere, Jr. et al. |
| 2003/0144996 A1 | 7/2003 | Moore, Jr. |
| 2007/0168999 A1 | 7/2007 | Haber et al. |
| 2007/0266329 A1 | 11/2007 | Gaudette |
| 2008/0244548 A1 | 10/2008 | Hind et al. |

(Continued)

FOREIGN PATENT DOCUMENTS

EP      1515248 A2     3/2005

(Continued)

OTHER PUBLICATIONS

Pauw, et al.; "Modeling Object-Oriented Program Execution," Prcdg of the 8th EIJ Conf on Object-Oriented Prog'g, Springer-Verlag Lecture Notes in CS; vol. 821, pp. 163-182; 1994.

(Continued)

*Primary Examiner*—Ryan R Yang
«74» *Attorney, Agent, or Firm*—Thorne & Halajian, LLP

«57» ABSTRACT

A method of enhancing a display of performance data in a hierarchical state diagram includes measuring a processing time P(t) for each transition action code T(t) of each hierarchical level of the hierarchical state diagram, measuring a processing time P(t) for each state of each hierarchical level of the hierarchical state diagram, and modifying the hierarchical state diagram to enlarge or decrease a width W(t) of transition lines in accordance with a ratio of processing times of all transition action codes in a same hierarchical level. The method also includes modifying the hierarchical state diagram to enlarge or decrease an area size S(x) of a state P(x) to a ratio of processing times of all states in a same hierarchical level, to enlarge or decrease a width W'(t) of an arrow representative of an EntryAction and ExitAction of a state in proportion to processing time and displaying the modified hierarchical state diagram to enhance visualization of the modified transition line width W(t), the modified area size S(x) and the modified EntryAction/ExitAction width W'(t).

3 Claims, 10 Drawing Sheets

U.S. PATENT DOCUMENTS

2008/0288916 A1  11/2008  Tazoe et al.

FOREIGN PATENT DOCUMENTS

| JP | 03-198090 | 8/1991 |
| JP | 63-237177 A | 10/1998 |

OTHER PUBLICATIONS

Mos, et al.; "Performance Management in Component-Oriented Systems Using A Model Driven Architecture Approach,"6th IEEE In Ent Distributed Object Computing Conf;pp. 227-237;2002.

Gargiulo, et al., "Gadget: A Tool for Extracting the Dynamic Structure of Java Programs," Dept. of Mathematics & CS, Drexel University, Philadelphia, PA; pp. 1-8; 2001.

Richner, et al., "Recovering High-Level Views of Object-Oriented Applications from Static and Dynamic Information," In Prod IEEE Int Conf on Software Maint, Aug. 30-Sep. 3, 1999.

METHOD TO VISUALIZE PERFORMANCE DATA OF A MULTI-LAYERED STATE DIAGRAM

FIELD OF THE INVENTION

The present invention is directed to visualizing performance data generated by programs prepared or written using hierarchical state diagrams.

State diagrams are used to describe the behavior of systems such as computer programs. State diagrams can describe the possible states of an object as events occur, where each diagram typically represents objects of a single class. State diagrams track the different states of the class objects through the system, graphically representing finite state machines. State diagrams can be hierarchical, with different levels representing states within states.

FIG. 1 herein depicts a hierarchical state diagram (100), from which code is generated in a C++ programming language (120). The program codes are automatically generated and are used temporarily for compilation. FIG. 2 highlights the hierarchical nature of state diagram (100), which is a top layer, or Layer 1. In any of layers 1, 2 and 3 as shown, program fragments are mainly coded in each transition t1, t2 .... The lower layers are representative of sub-states of the states comprising the upper layers. As shown in FIG. 2, state A2 comprises substates A2_0, A2_2, A2_3 and A2_4 of Layer 2 (102), where Layer 3 (104) represents sub-states of A2_2 of Layer 2 (102).

Typically, known profilers count the call times and execution times of functions comprising the generated code (FIG. 1; 110) and present the data in the table format (120), reproduced in FIG. 3. Some profilers can draw and present the result in graphical form (130) as shown in FIG. 3. It is difficult to understand this performance data of programs written in hierarchical state diagrams, such as RoseRT models, because the names of generated functions from those models are different from the originals. When measuring performance, the data is presented with the generated names. This makes it quite difficult to understand which data entry corresponds to which original model element (in the state machine diagram).

SUMMARY OF THE INVENTION

The invention provides a system and method that overcomes shortcomings of programs written using hierarchical state diagrams.

The invention provides a system and method for improved visualization of performance data of a state diagram.

In an embodiment, the invention provides a method of enhancing a display of performance data in a hierarchical state diagram, including measuring a processing time $T(t)$ for each transition action code $T(t)$ comprising each hierarchical level of the hierarchical state diagram;

measuring a processing time $P(t)$ for each state comprising each hierarchical level of the hierarchical state diagram;

modifying the hierarchical state diagram to enlarge or decrease a width $W(t)$ of transition lines in accordance with a ratio of processing times of all transition action codes in a same hierarchical level, wherein $W(t)=W0+T(t)/\Sigma T(i)*MAX\_W$, where $W0$ is a default width;

modifying the hierarchical state diagram to enlarge or decrease an area size $S(x)$ of a state $P(x)$ to a ratio of processing times of all states in a same hierarchical level, wherein $S(x)=S0+P(t)/\Sigma P(i)*MAX\_S$, where $S0$ is the default size;

modifying the hierarchical state diagram to enlarge or decrease a width $W'(t)$ of an arrow representative of an EntryAction and ExitAction of a state in proportion to processing time, wherein $W'(t)=W0'+T(EntryAction)/(T(EntryAction)+T(ExitAction)+\Sigma T(j))*MAX\_W'$, where $\Sigma T(j)$ is a total of all processing time for all transition action codes in a substate; and displaying the modified hierarchical state diagram to enhance visualization of the modified transition line width $W(t)$, the modified area size $S(x)$ and the modified EntryAction/ExitAction width $W'(t)$ using different colors or other different physical attributes and displaying a processing time and number of times each element is displayed in the state diagram upon activating said each element with user input means.

BRIEF DESCRIPTION OF THE DRAWING FIGURES

The present invention is illustrated by way of example and not limitation in the figures of the accompanying drawings. The same numbers are used throughout the figures to reference like components and/or features.

DETAILED DESCRIPTION OF THE INVENTION

Figure 1:
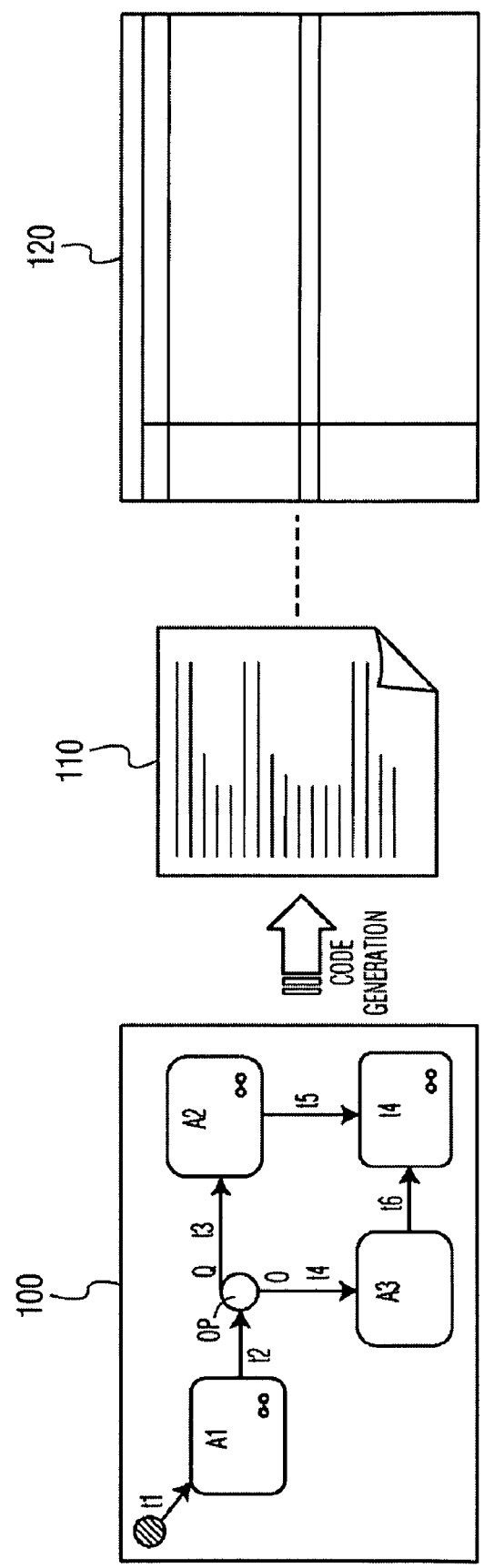
FIG. 1 depicts a first layer of a hierarchical state diagram, its generated code and its performance data.
Figure 4:
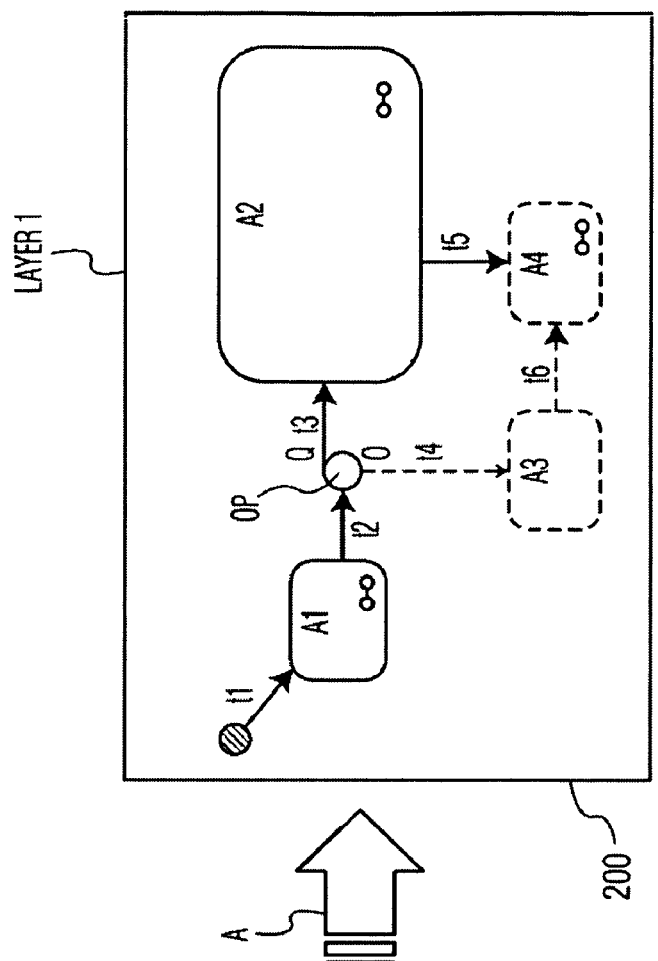
FIG. 4 depicts the hierarchical state diagram and a second hierarchical state diagram modified according to the present invention as indicated by a process arrow A.
Figure 4:
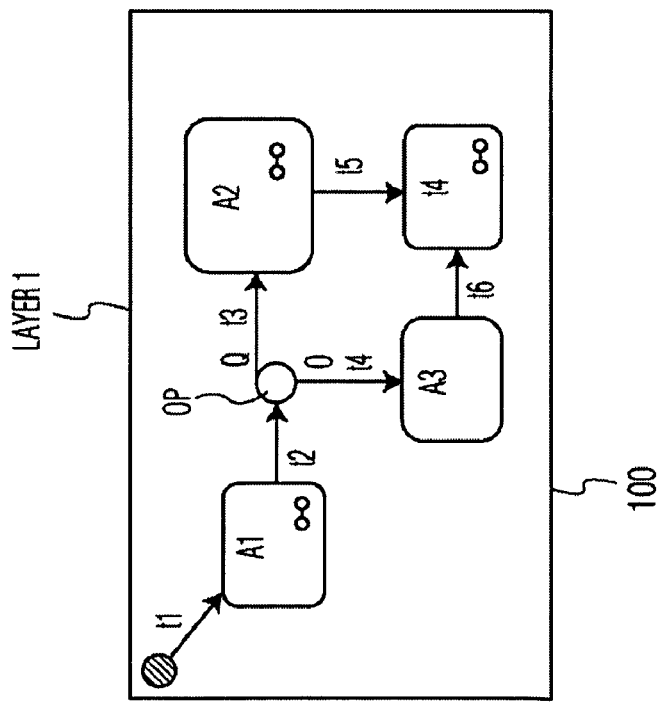

The inventive method for improved visualization of performance data of a hierarchical state diagram measures a processing time of action codes of transitions, and of every action code inside a state and its sub-states. To communicate same, the state diagram presents and changes the width of transition line to the ratio of processing times of all action codes of transitions in the same hierarchical level of a state diagram. The thicker line shows a heavier point in the diagram. This is highlighted in FIG. 4, herein. FIG. 4 reproduces state diagram (100) of FIG. 1, and depicts a state diagram (200) that is a version of state diagram (100) modified in accordance with the present invention indicated by process arrow A.

As seen in modified state diagram (200), t2, t4, A2 and A3 are modified. It can be readily inferred that a state, 'A2', and action, 't2', are the heavy points of executing this model (state diagram). It is those elements that are emphasized in accordance with the invention. The inventive method changes the area size of a state to the ratio of processing times of all states in the same hierarchical level of a state diagram. The larger state shows a heavier state in a diagram. Elements that are not measured are modified in view style, for example, by the use of dotted lines, the use of color, etc., to distinguish same from the measured ones.

Modified Layer 1 of FIG. 4 highlighting the performance data in the original state diagram (100, for example, by displaying a bolder and wider t2, a dashed t4, a dashed A3 (200) and a dashed t6 (200). As such, users readily understand the result intuitively. Moreover, by passing the performance data in the lower layers to its parents (upper layers), a user can recognize the heavier elements without traversing the state diagram hierarchy. Heavier elements as used herein are those states and substates having consuming transition codes.

The novel visualization method measures various items comprising the state diagram, such as state diagram (100). The method then measures the processing time of all transition codes of all hierarchical layers, for example all of the processing codes t1, t2, t3, t4, t5 and t6 of state diagram (100). The processing time of a state is a sum of processing time of transition codes and EntryAction/ExitAction codes of the state (as shown). For example, the processing time of processing code A2 is as follows.

Figure 2:
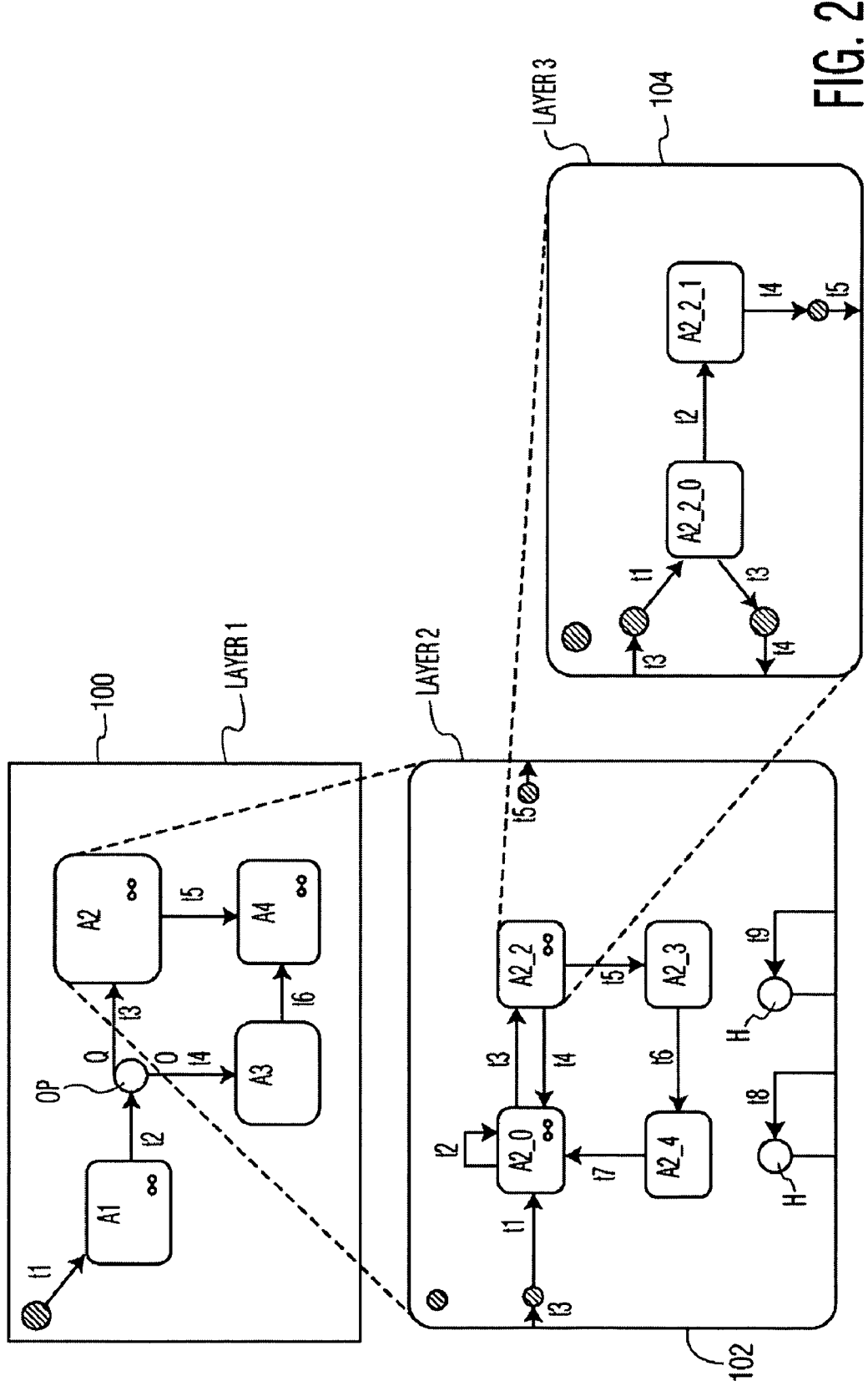
FIG. 2 depicts a first, a second and a third layer of the hierarchical state diagram of FIG. 1.
Figure 3:
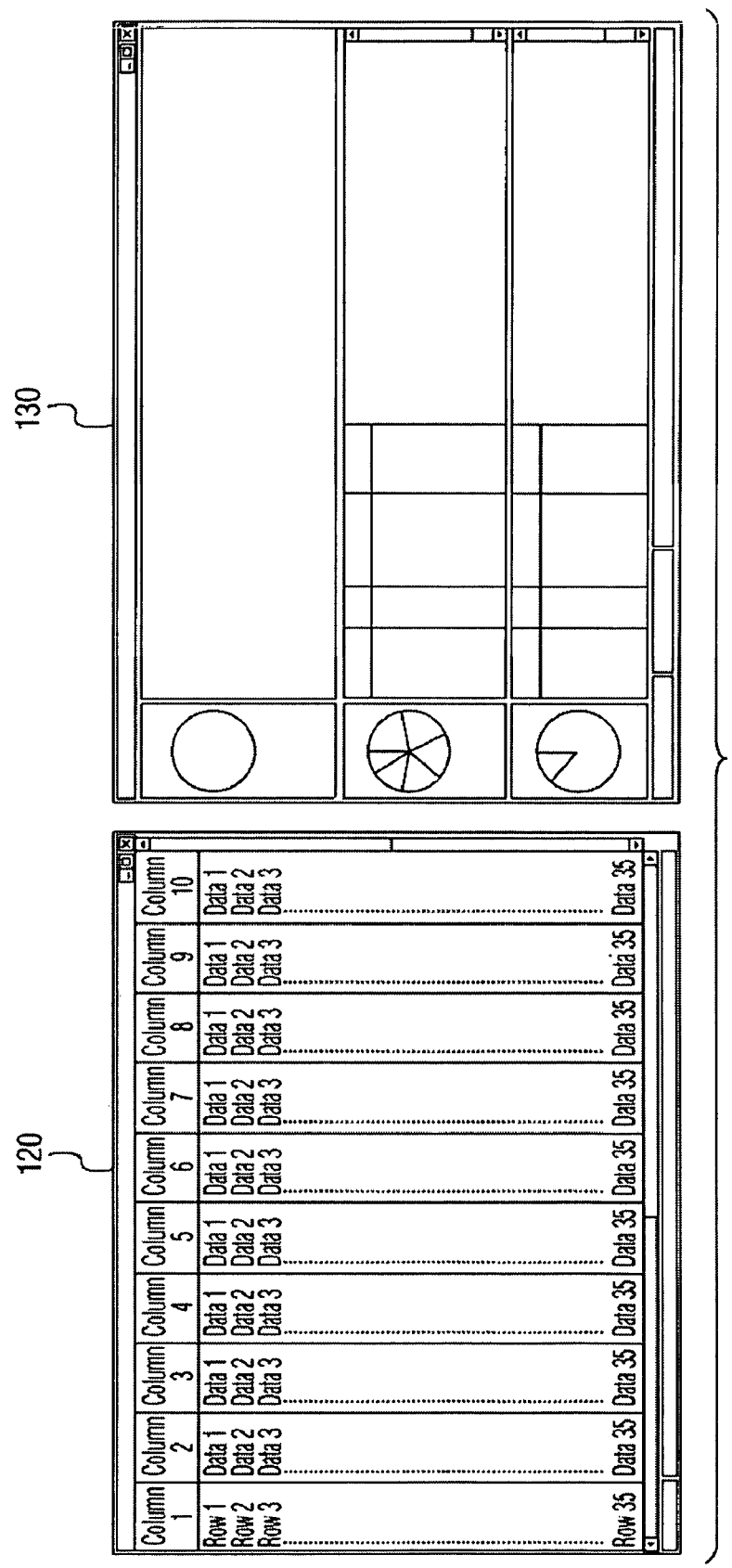
FIG. 3 depicts the performance data of a hierarchical state diagram of FIG. 1 and a graphical representation of a profiling result.

The processing time of processing code A2 (FIG. 2) is the sum of the following items from 1 to 5:

1. the processing time of Entry/ExitAction codes of A2 in state diagram (100), or Layer 1;
2. the total processing time of all transition codes in Layer 2 (102), the next hierarchical level down from Layer 1;
3. the processing time of all EntryAction/ExitAction of all states (or sub-states) of Layer 2 (102), corresponding to A2;
4. the total processing time of all transition code, t1, t2, t3 and t4 of Layer 3 (104), which is the next hierarchical level down of A2_2; and
5. The total processing time of all EntryAction/ExitAction of all states in Layer 3 (104).

Figure 5:
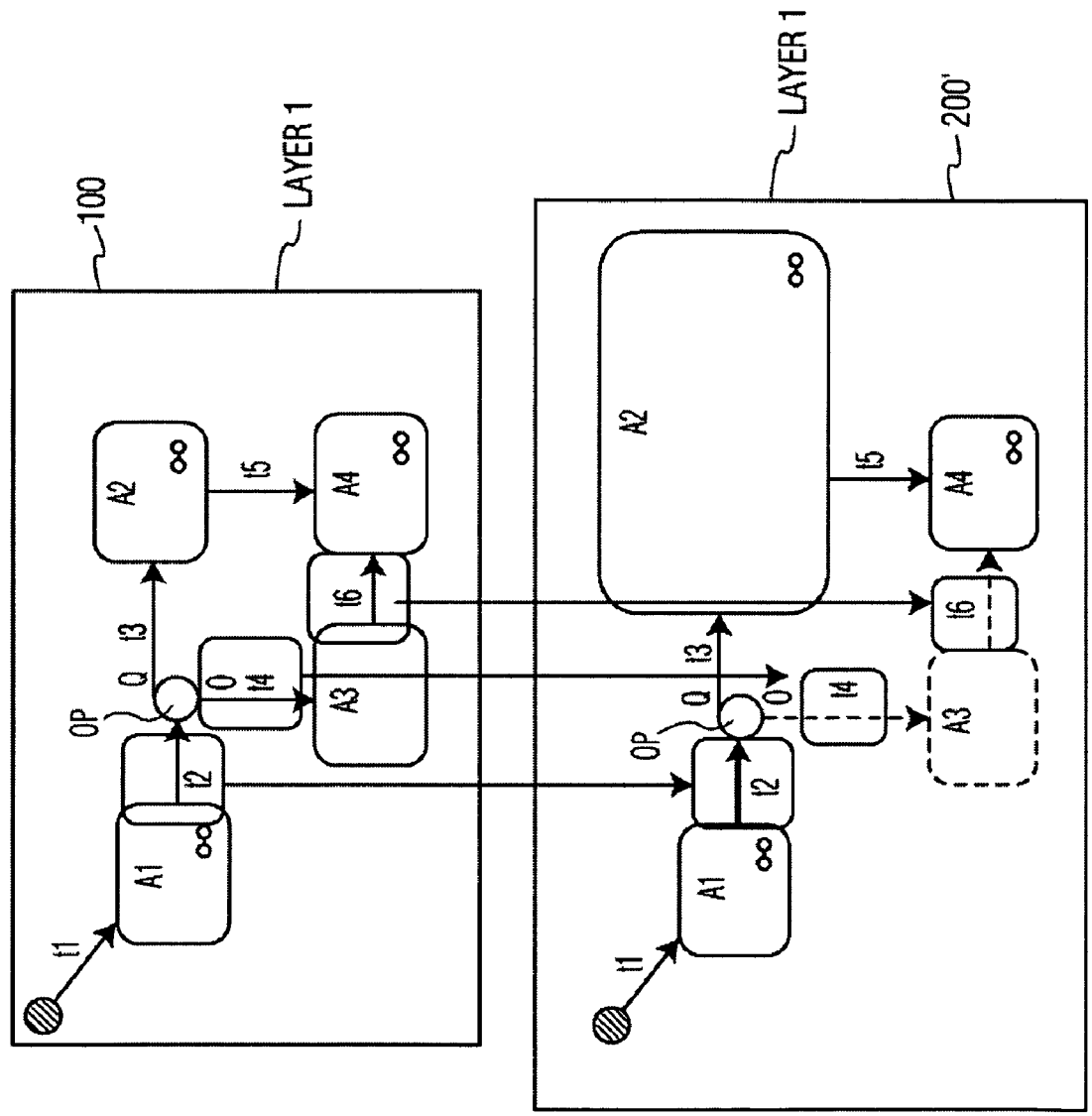
FIG. 5 depicts Layer 1 of hierarchical state diagram and another version (200') that is modified in accordance with the invention.

The inventive method displays the transition lines, as discussed above. FIG. 5 depicts Layer 1 of state diagram (100) and modified state diagram (200'). Each processing time of the transition lines is assumed to be T(t). Each width of lines is expressed in a ratio of processing time in accordance with the following expression.

$$W(t)=W0+T(t)/\Sigma T(i)*MAX\_W$$

where:

W0 is the default width;

$\Sigma T(i)$ is a total of all processing time for all transition action codes for the range of state "i";

the range of "i" is: $0<=i<=$ the number of transition lines; and

MAX_W is some constant number of the line width.

When the processing time is zero, that is, in the part that does not change, the processing time is displayed in a way that distinguishes same from it depiction in the unmodified version (100). The processing time could be distinguished by displaying it using a dotted line of a different color, a different shape, or a different grayscale shade. For example, as a measurement result when a state changes from t1→A1→t2→t3→A2→t5→A4, each line is displayed as shown in state diagram (200') of FIG. 6 according to W(t). And as is shown, t2 is displayed to be larger, or thicker than as shown in state diagram 100, and bolded, and t4 and t6 are displayed in gray dotted lines.

Figure 6:
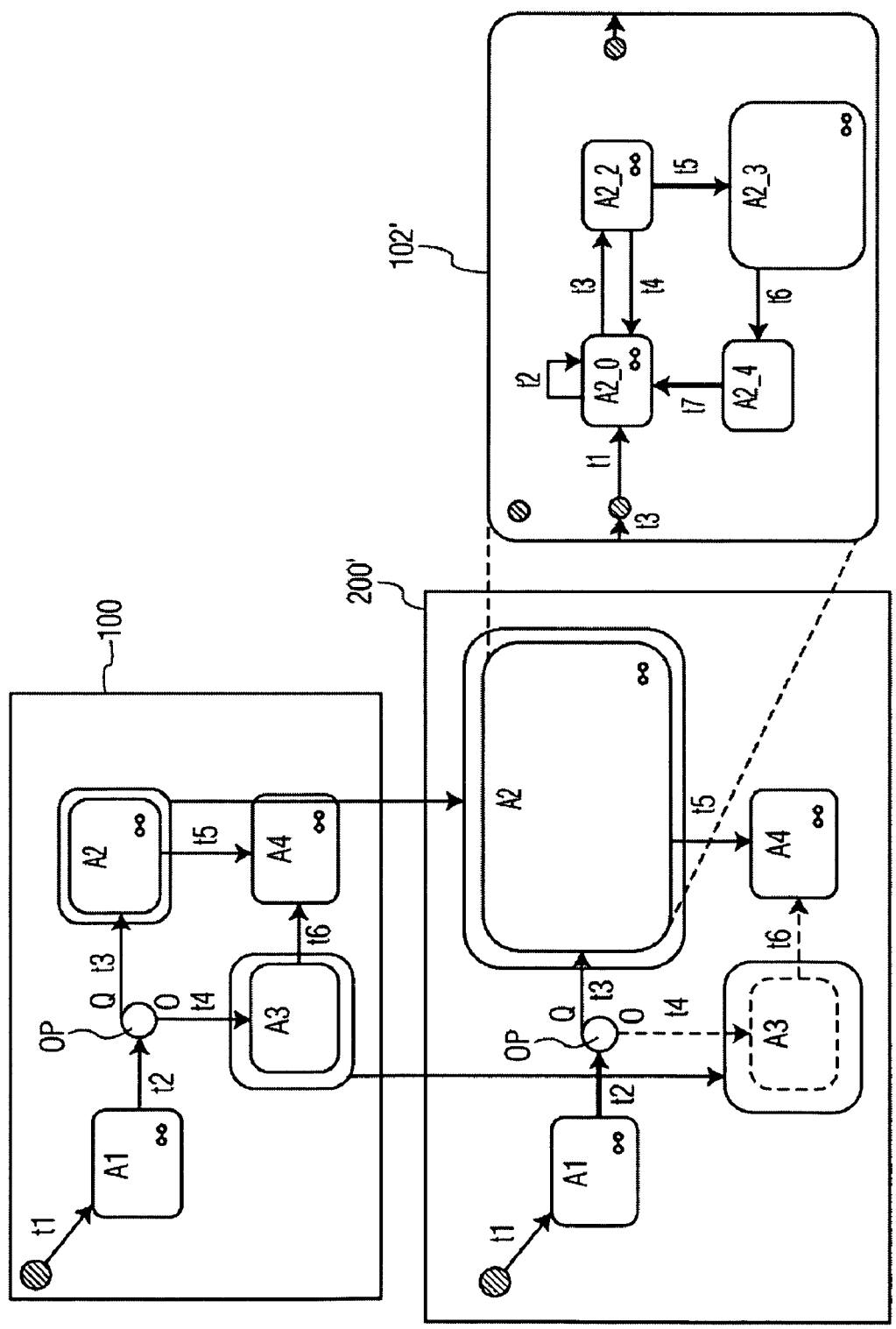
FIG. 6 depicts that each size $S(x)$ of the states of the modified hierarchical diagram is expressed in a ratio of processing time.

In addition, each processing time of the states in state diagram (100) is assumed to be P(x), where x is A1, A2, A3, or A4. In FIG. 6, each size S(x) of the states, where $S(x) \to S(k)$, is expressed in a ratio of processing time in accordance with the following expression.

$$S(x)=S0+P(x)/\Sigma P(i)*MAX\_S,$$

where:

S0 is the default size;

P(i) Processing time of state "i";

the range of "i" is $0<=i<=$ the number of state; and

MAX_S is some state size constant number.

In a case where the state that does not change, the size is expressed in some distinguishing way, for example, by presenting the dotted line of different colors or shades of grayscale. For example, as a measurement result when a state changes like t1→A1→t2→t3→A2→t5→A4, each state is displayed as shown in FIG. 6 based on the aforementioned rule. A2 has bus, processes (A2_3, t5 and t 7, as shown in sub-state diagram (102') of FIG. 6. According to S(x), A2 is displayed larger in state diagram (200') than in state diagram (100), and according to a rule that non-changing states, i.e., non-transited states, are displayed in different colors or varying shades of grayscale, A3 is displayed in a gray dotted line in state diagram (200').

Figure 7:
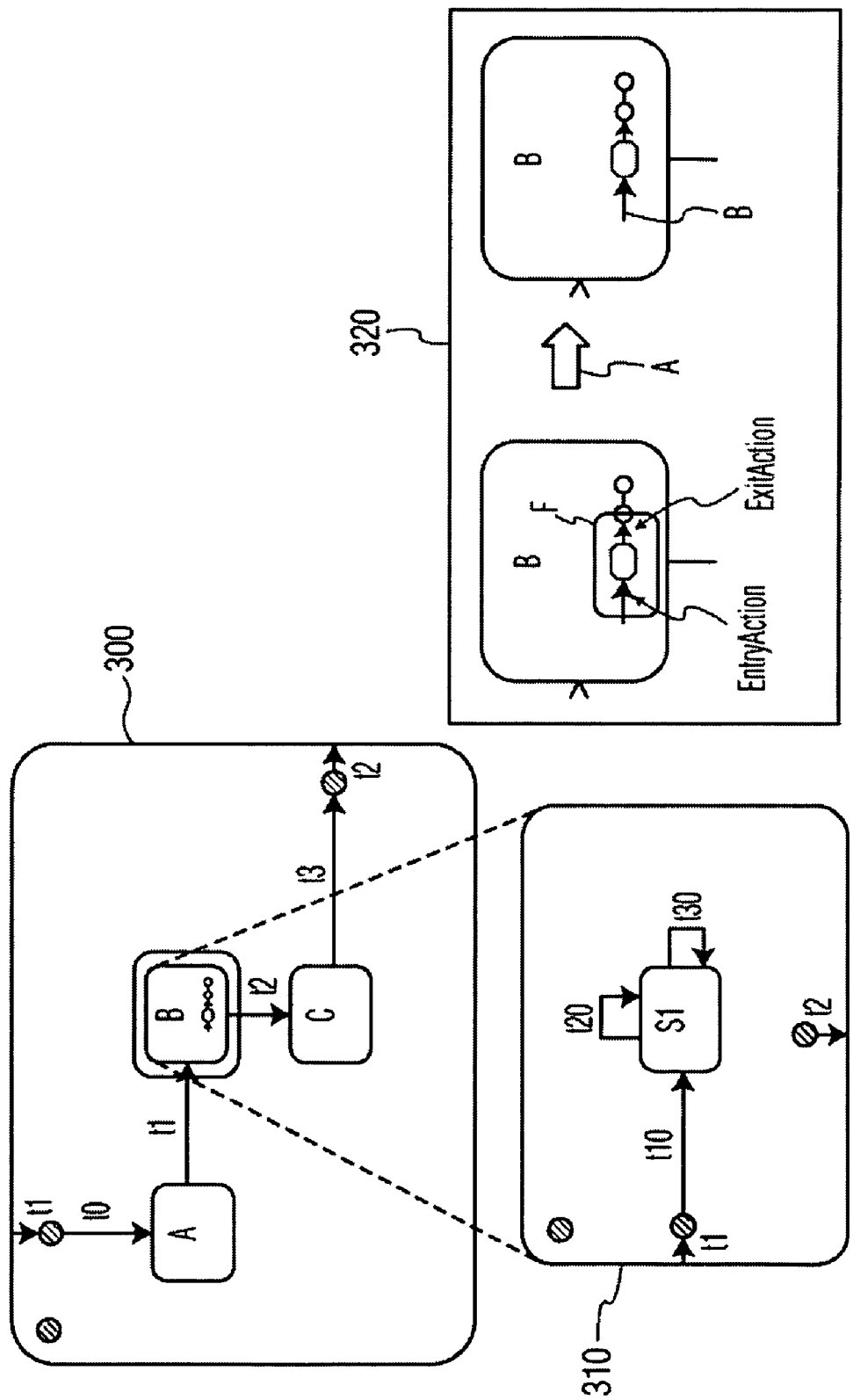
FIG. 7 depicts an exemplary state diagram (300) to highlight a case wherein a processing time of Entry/Exit Action of state B is added up.

Another exemplary state diagram (300) is shown in FIG. 7 to highlight a case where a processing time of state B is added up. Sub-state B is depicted in diagram (310) in FIG. 7, including EntryAction/ExitAction of state B, and action codes on transition lines (t10, t20, and t30) as shown. EntryAction and ExitAction of state B (300) are displayed with the arrows in the frame F shown in diagram (320) FIG. 7, after inventive processing indicated by arrow A. A width of an arrow B is displayed thereafter in proportion to processing time. The novel calculation method of the width is similar to that of the transition line, as already described in detail above.

$$\text{Width of EntryAction}=W0+(T(\text{EntryAction})/(T(\text{EntryAction})+T(\text{ExitAction})+T(t10)+T(t20)+T(t30)))*MAX\_W.$$

where:

T(EntryAction) is processing time of EntryAction of a state;

T(ExitAction) is processing time of ExitAction of a state; and

T(t30) is processing time of transition line "t30".

Figure 8:
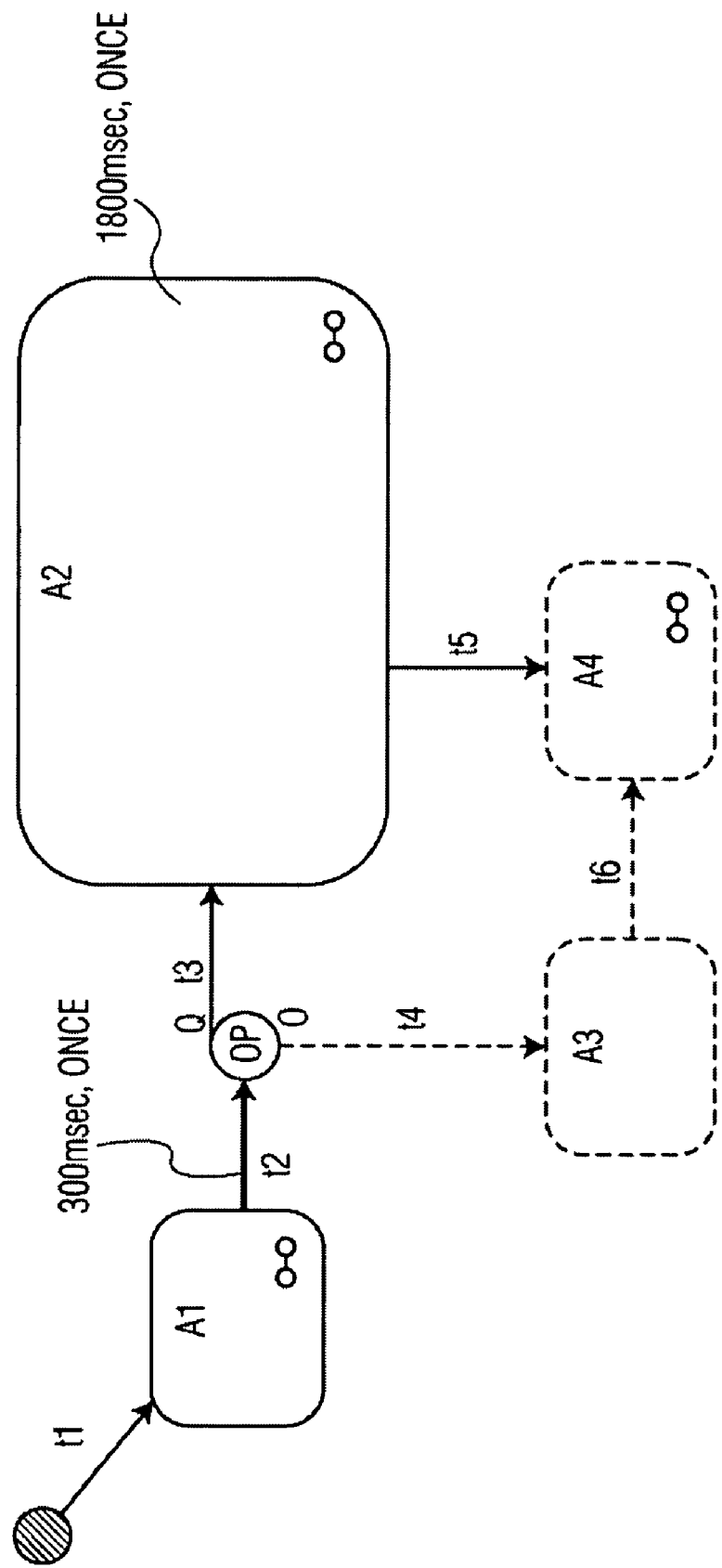
FIG. 8 depicts a hierarchical state diagram wherein upon overlapping a UML element with a mouse pointer, a processing time and a practice number of times for the element are displayed.

The inventive method further displays the following detailed information by addition, as shown in state diagram (100) depicted in FIG. 8 herein. The processing time of action code on transition line and the number of times that passed transition line; and the indication of the detailed information enable an inference of a more substantial analysis. However, if all of the information is displayed, the screen becomes complicated and it becomes difficult to understand all of the detailed information. Hence, when a mouse pointer and a UML element overlap, the processing time and the practice number of times for the element are displayed. That is, only particularly long processing times are displayed, as shown in FIG. 8 (300 msec. once; 1800 msec. once).

Figure 9:
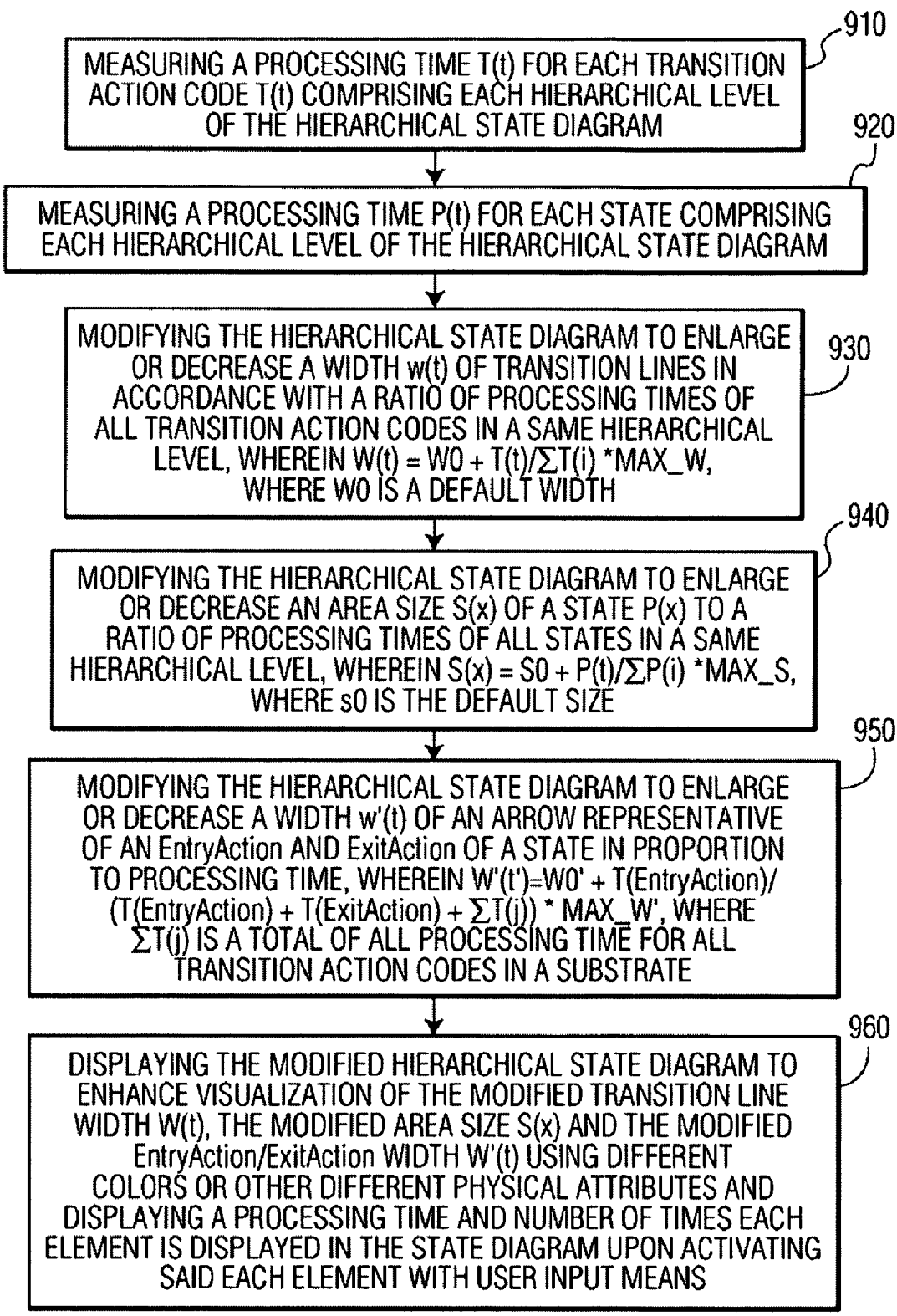
FIG. 9 depicts an embodiment of a method of visualizing performance data of a hierarchical state diagram in accordance with the invention.

FIG. 9 herein depicts one embodiment of a method of visualizing performance data of a hierarchical state diagram in accordance with the invention. The method includes a step of measuring a processing time P(t), i.e., a trim for each transition action code T(t) comprising each hierarchical level of the hierarchical state diagram, as indicated by block (910). The method further includes a step of measuring a processing time P(t) for each state comprising each hierarchical level of the hierarchical state diagram, as indicated by block (920). Block (930) indicates a step of modifying the hierarchical state diagram to enlarge or decrease a width W(t) of transition lines in accordance with a ratio of processing times of all transition action codes in a same hierarchical level, wherein W(t)=W0+T(t)/ΣT(i)*MAX_W, where W0 is a default width W(t).

Block (940) indicates a block of modifying the hierarchical state diagram to enlarge or decrease an area size S(x) of a state P(x) to a ratio of processing times of all states in a same hierarchical level, wherein S(x)=S0+P(t)/Σ(P(i)*MAX_S, where S0 is the default size, and block (950) indicates a step of modifying the hierarchical state diagram to enlarge or decrease a width W'(t) of an arrow representative of an EntryAction and ExitAction of a state in proportion to processing time, where W'(t')=W0'+T(EntryAction)/(T(EntryAction)+T(ExitAction)+ΣT(j))*MAX_W', where ΣT(j) is a total of all processing time for all transition action codes in a substate.

The method further includes a step of displaying the modified hierarchical state diagram to enhance visualization of the modified transition line width W(t), the modified area size S(x) and the modified EntryAction/ExitAction width W'(t) using different colors or other different physical attributes and displaying a processing time and number of times each element is displayed in the state diagram upon activating said each element with user input means, as indicated by block (960).

The various method embodiments of the invention will be generally implemented by a computer executing a sequence of program instructions for carrying out the steps of the method, assuming all required data for processing is accessible to the computer. The sequence of program instructions may be embodied in a computer program product comprising media storing the program instructions.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the method, and variations on the method as described herein. Alternatively, a specific use computer, containing specialized hardware for carrying out one or more of the functional tasks of the invention, could be utilized.

Figure 10:
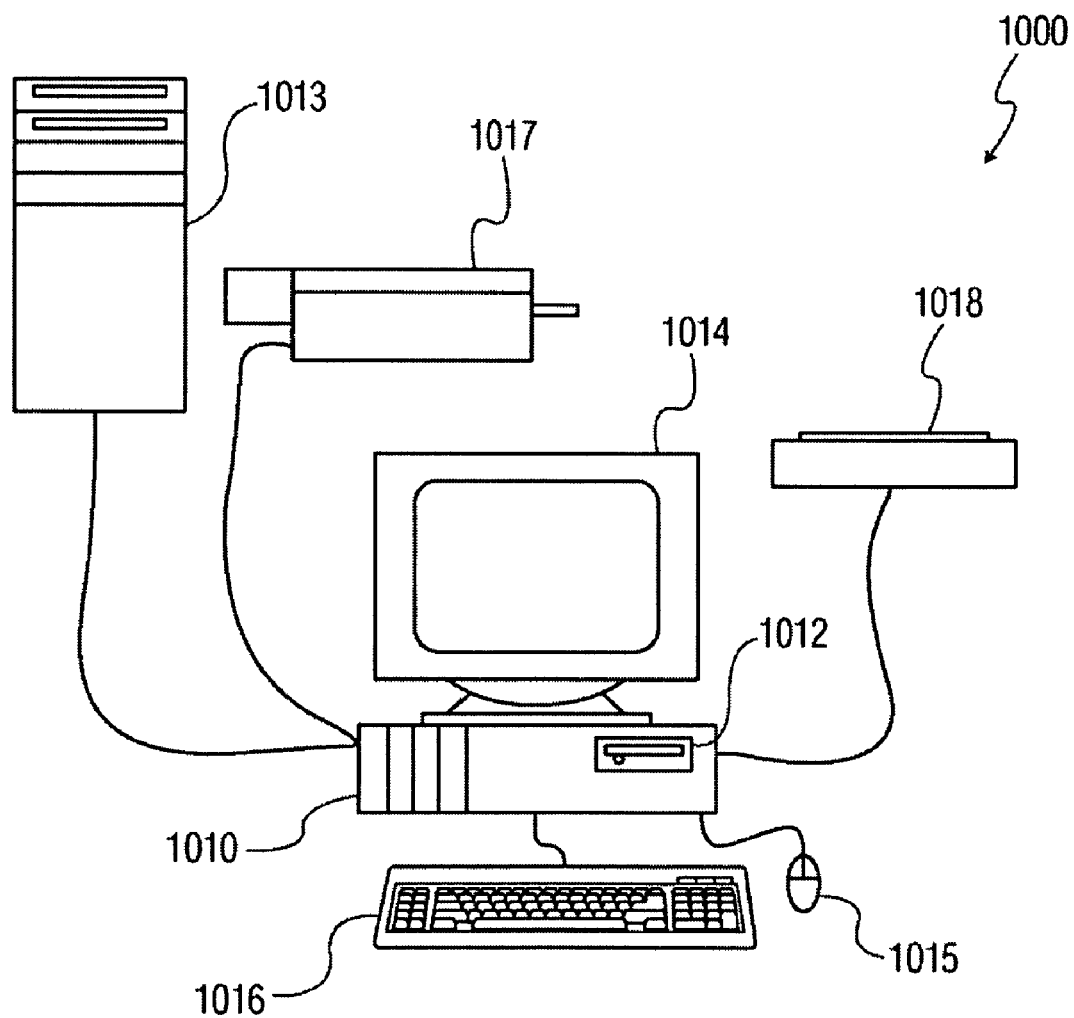
FIG. 10 depicts a computer-based system (1000) by which the inventive method may be carried out.

A computer-based system (1000) is depicted in FIG. 10 herein, by which the inventive method may be carried out. The computer-based system (1000) includes a processing unit (1010), which houses a processor, memory and other systems components (not shown expressly in the drawing figure) that implement a general purpose processing system, or computer that may execute a computer program product. The computer program product may comprise media, for example a compact storage medium such as a compact disc, which may be read by the processing unit (1010) through a disc drive (1012), or by any means known to the skilled artisan for providing the computer program product to the general purpose processing system for execution thereby.

The computer program product comprises all the respective features enabling the implementation of the inventive method described herein, and which—when loaded in a computer system—is able to carry out the method. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer program product may be stored on hard disk drives within processing unit (1010), as mentioned, or may be located on a remote system such as a server (1013), coupled to processing unit (1010), via a network interface such as an Ethernet interface. Monitor (1014), mouse (1015) and keyboard (1016) are coupled to the processing unit (1010), to provide user interaction. Scanner (1018) and printer (1017) are provided for document input and output. Printer (1017) is shown coupled to the processing unit (1010) via a network connection, but may be coupled directly to the processing unit. Scanner (1018) is shown coupled to the processing unit (1010) directly, but it should be understood that peripherals might be network coupled, or direct coupled without affecting the ability of the processing unit (1010) to perform the method of the invention.

Although examples of the present invention have been shown and described, it would be appreciated by those skilled in the art that changes may be made in these embodiments without departing from the principles and spirit of the invention, the scope of which is defined in the claims and their equivalents, and it is intended that all matter contained in the foregoing specification and drawings be taken as illustrative and not in an exclusive sense.

What is claimed is:

1. A method of enhancing a display of performance data in a hierarchical state diagram, comprising steps of:

measuring a processing time P(t) for each transition action code T(i) comprising each hierarchical level of the hierarchical state diagram;

measuring a processing time P'(t) for each state comprising each hierarchical level of the hierarchical state diagram;

modifying by a processor the hierarchical state diagram to enlarge or decrease a width W(t) of transition lines in accordance with a ratio of processing times of all transition action codes in a same hierarchical level, wherein W(t)=W0+T(t)/ΣT(i)*MAX_W, where W0 is a default width, T(t) is a processing time for each transition action code, ΣT(i) is a total of all processing time for all transition action codes for a range of state "i", the range of "i" is from 0 to a number of the transition lines, and MAX_W is a constant number of a transition line width;

modifying the hierarchical state diagram to enlarge or decrease an area size S(x) of a state P(x) to a ratio of processing times of all states in a same hierarchical level, wherein S(x)=S0+P(t)/ΣP(i)*MAX_S, where S0 is the default size, P(i) is a processing time of state "i", and the range of "i" is from 0 to a number of the states, and MAX_S is a state size constant number;

modifying the hierarchical state diagram to enlarge or decrease a width W'(t) of an arrow representative of an EntryAction and ExitAction of a state in proportion to processing time, wherein W'(t)=W0'+T(EntryAction)/(T(EntryAction)+T(ExitAction)+ΣT(j))*MAX_W', where ΣT(j) is a total of all processing time for all transition action codes in a substate, where W0' is a modified default width, T(EntryAction) is processing time of EntryAction of a state, T(ExitAction) is processing time of ExitAction of a state, and MAX_W' is a modified constant number of the transition line width; and displaying the modified hierarchical state diagram to enhance visualization of the modified transition line width W(t), the modified area size S(x) and the modified EntryAction/ExitAction width W'(t).

2. The method of enhancing a display of performance data in a hierarchical state diagram as set forth in claim 1, wherein the displaying includes using different colors or other different physical attributes.

3. The method of enhancing a display of performance data in a hierarchical state diagram as set forth in claim 1, wherein the displaying includes displaying a processing time and number of times each element is displayed in the state diagram upon activating said each element with user input means.

* * * * *